United States Patent
Böhringer et al.

(10) Patent No.: US 6,540,044 B1
(45) Date of Patent: Apr. 1, 2003

(54) REGULATING SYSTEM

(75) Inventors: Michael Böhringer, Waiblingen (DE); Lutz Eckstein, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/673,911
(22) PCT Filed: Jan. 20, 2000
(86) PCT No.: PCT/EP00/00424
§ 371 (c)(1),
(2), (4) Date: Feb. 2, 2001
(87) PCT Pub. No.: WO00/50290
PCT Pub. Date: Aug. 31, 2000

(30) Foreign Application Priority Data

Feb. 24, 1999 (DE) .......................... 199 07 792

(51) Int. Cl.$^7$ ................................ B62D 5/99
(52) U.S. Cl. ............................ 180/446; 701/41; 701/42
(58) Field of Search ..................... 701/41, 42; 180/443, 180/446, 402, 403, 406

(56) References Cited

U.S. PATENT DOCUMENTS

| | | | | |
|---|---|---|---|---|
| 5,247,441 A | * | 9/1993 | Serizawa et al. | 180/402 |
| 5,360,077 A | * | 11/1994 | Nishimoto et al. | 180/79.1 |
| 5,471,386 A | * | 11/1995 | Hrovat et al. | 180/197 |
| 5,481,457 A | * | 1/1996 | Yamamoto et al. | 180/446 |
| 5,504,679 A | * | 4/1996 | Wada et al. | 364/424.05 |
| 5,541,841 A | * | 7/1996 | Tanaka | 180/446 |
| 5,845,222 A | * | 12/1998 | Yamamoto et al. | 180/422 |
| 6,018,691 A | * | 1/2000 | Yamamoto et al. | 180/404 |
| 6,097,286 A | * | 8/2000 | Discenzo | 340/465 |
| 6,176,341 B1 | * | 1/2001 | Ansari | 180/402 |
| 6,209,677 B1 | * | 4/2001 | Bohner et al. | 180/402 |
| 6,219,604 B1 | * | 4/2001 | Dilger et al. | 180/422 |
| 6,269,903 B1 | * | 8/2001 | Bohner et al. | 180/402 |
| 6,363,305 B1 | * | 3/2002 | Kaufmann et al. | 180/402 |
| 6,370,460 B1 | * | 4/2002 | Kaufmann et al. | 180/402 |

FOREIGN PATENT DOCUMENTS

DE          198 01 974          7/1998

* cited by examiner

Primary Examiner—Lesley D. Morris
Assistant Examiner—L. Lum
(74) Attorney, Agent, or Firm—Crowell & Moring LLP

(57) ABSTRACT

A control system for coupling two final control elements as regards the actuated position and the actuating force, in which each final control element is assigned a separate force-control loop, these loops being coupled to one another by way of the actual-force values prevailing at the final control elements, is to be improved as regards its versatility for different applications. According to the invention, this is achieved by virtue of the fact that the two force-control loops are coupled by a proportionality factor, thus giving a force transmission ratio between the final control elements. The control system according to the invention can be used with particular advantage in a steer-by-wire steering system of a motor vehicle, in which case one final control element is formed by a steering handle and the other final control element is formed by steered vehicle wheels.

7 Claims, 1 Drawing Sheet

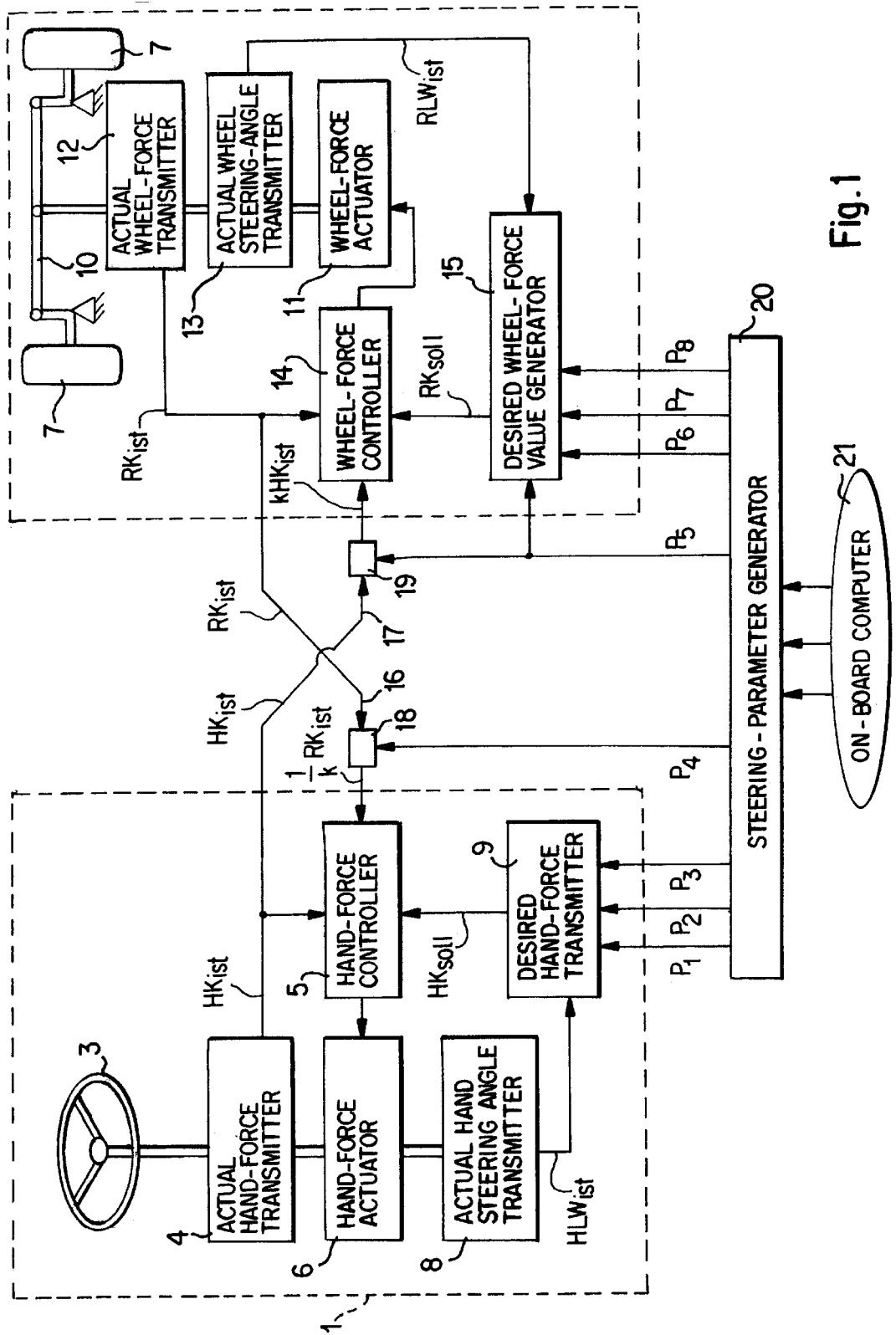

REGULATING SYSTEM

FIELD OF THE INVENTION

The invention relates to a control system for coupling two final control elements as regards the actuated position and the actuating force.

BACKGROUND OF THE INVENTION

EP 0 591 890 A1 has disclosed a control system of the type stated at the outset which is designed as a synchronisation control system and synchronises or couples a pilot's joystick and a copilot's joystick as regards the actuated position and the actuating force. For this purpose, the known synchronisation control system has two force-control loops of identical construction. In each of these force-control loops, the joystick serving as a final control element actuates an actual-force transmitter for producing an actual-force signal correlating with forces prevailing at the joystick and an actual-position transmitter for producing an actual-position signal correlating with the actuated position selected at the joystick. Each of the force-control loops furthermore has a desired-force generator, which generates a desired-force signal from the actual-position signal as a function of a specified relationship between actuated positions and actuating forces. Moreover, each force-control loop has a force controller which, as a function of the force signals present at an input of the force controller, actuates a force actuator in such a way that the specified relationship between the actuated positions and the actuating forces is established at the joystick. The two force-control loops are coupled to one another by way of their actual-force signals, that is to say the actual-force signals of one (first) force-control loop are additionally fed to the input of the force controller of the other (second) force-control loop, and the actual-force signals of the second force-control loop are additionally fed to the input of the force controller of the first force-control loop. With the aid of this synchronisation control system, the one joystick can rapidly and accurately adopt the position, selected at the other joystick. Moreover, the forces or moments applied at one joystick can be felt very precisely and directly at the other joystick. The synchronisation of the two joysticks is equivalent to play-free mechanical coupling in terms of its directness, rapidity and accuracy.

The present invention deals with the problem of specifying an embodiment for a control system of the type stated at the outset that is versatile in use.

This problem is solved by means of a control system according to the invention herein.

SUMMARY OF THE INVENTION

The invention is based on the general idea of coupling the two force-control loops to one another by way of a proportionality factor. By means of this measure, it is possible to achieve a force transmission ratio between the two final control elements that makes the control system versatile in terms of its uses.

For example, the control system configured in accordance with the invention can be used on a gripping arm that has a manually actuated handle and gripping tongs for gripping heavy objects. Here, the handle forms the first final control element and is assigned to one force-control loop, while the gripping tongs form the second final control element, which is assigned to the other force-control loop. By means of the handle, a user can actuate the gripping tongs in order to grip an object. At the same time, the control system according to the invention can be set in such a way that a relatively small force introduced manually into the handle produces a relatively large gripping force at the gripping tongs.

It is particularly advantageous if the control system according to the invention is used to form a steer-by-wire steering system in a motor vehicle. The final control element of one force-control loop is here formed by the steering handle, e.g. steering wheel, of the vehicle while the final control element of the second force-control loop is formed by the steered vehicle wheels while the final control element of the second force-control loop is formed by the steered vehicle wheels. The directness, rapidity and accuracy of coupling between the two final control elements, or steering handle and steered vehicle wheels, as described above gives the driver a particularly good feeling for the forces prevailing at the steered vehicle wheels and thus for the road over which the vehicle is travelling. In this arrangement, the transmission ratio produced by the proportionality factor between the steering forces acting at the two final control elements (steering handle and steered vehicle wheels) brings about servo assistance.

In a particularly advantageous embodiment of the control system according to the invention, the relationship between the actuated positions and actuating forces of the associated final control element which is specified in the desired-force generator of one force-control loop can differ from the relationship specified in the desired-force generator of the other force control loop for the actuated positions and actuating forces of the corresponding other final control element. This measure has the effect of a transmission ratio between the actuating movements of one final control element, e.g. the steering handle, and the adjusting movements of the other final control element, e.g. the steered vehicle wheels. The adaptability of the control system according to the invention to different applications is thereby considerably increased. For example, this means that the control system can be adapted particularly well to the conditions prevailing in a vehicle steering system so that the control system can be used in a steer-by-wire steering system. In general, the steering angle established at the steering handle in a vehicle is considerably larger than the associated steering angle assumed by the steered vehicle wheels, with the result that a transmission ratio is required between the adjusting movements of these final control elements. Instead of a complicated mechanism, this transmission ratio is here achieved by means of appropriate adaptation, e.g. by means of a correction factor, of the relationship between the actuated position and the actuating force of at least one of the final control elements.

In an advantageous embodiment, the proportionality factor can be varied as a function of parameters, thereby allowing the force transmission ratio between the force-control loops to be made dependent on parameters. In a preferred embodiment, for example, this means that the vehicle steering can operate with little servo assistance, i.e. in a relatively stiff manner, at relatively high vehicle speeds and with a large amount of servo assistance, i.e. relatively easily, at relatively low vehicle speeds, e.g. for manoeuvring.

According to a development of the control system according to the invention, the relationship between the actuated positions and the actuating forces of the final control element in one force-control loop and/or in the other force-control loop can be varied as a function of parameters. In these embodiments, mass/spring-damping characteristics can be incorporated into the steering system when the control system is used in a steer-by-wire steering system of a vehicle, for example, these characteristics enabling self-centring of the steered vehicle wheels, for example. It is likewise possible, by means of these embodiments, preferably as a function of the vehicle speed, to alter the transmission ratio of the movements of the final control elements, i.e. the association between steering angles at the steering wheel and steering angles at the vehicle wheels.

What has been said about "forces" in this description applies also in a corresponding manner to "moments" and, in particular, it is likewise possible for moments to be picked off or introduced at the final control elements instead of forces.

Further important features and advantages of the control system according to the invention will become apparent from the subclaims, the drawing and the associated description of the figures with reference to the drawing.

It is self-evident that the abovementioned features and those yet to be mentioned can be employed not only in the respectively indicated combination but also in other combinations or alone without departing from the scope of the present invention.

A preferred exemplary embodiment of the invention is illustrated in the drawing and is explained in greater detail in the following description.

BRIEF DESCRIPTION OF THE DRAWINGS

FIG. 1 shows a basic schematic representation of a steer-by-wire steering system for a motor vehicle based on the control system according to the invention.

DETAILED DESCRIPTION OF THE PREFERRED EMBODIMENTS

As shown in FIG. 1, a vehicle steering system according to the invention has a first force control loop for a steer-by-wire mode, namely a hand-force control loop 1, which is indicated in FIG. 1 by a border in broken lines. The steering system according to the invention furthermore has a second force control loop, namely a wheel-force control loop 2, which is likewise picked out by means of a border in broken lines in FIG. 1.

As a final control element, the hand-force control loop 1 has a steering handle 3, which is formed by a steering wheel in the exemplary embodiment. The steering handle 3 can likewise be formed by a joystick or side stick. The steering handle 3 is coupled to an actual hand-force transmitter 4, which supplies an actual hand-force signal $HK_{ist}$ to a hand-force controller 5 when actuated by the steering handle 3.

The steering handle 3 is coupled to a hand-force actuator 6, which is used to provide a, haptic effect at the steering handle 3. This haptic effect is intended essentially to reflect the forces prevailing at the steered vehicle wheels 7 in order to give the driver a realistic feeling for the current driving state of the vehicle.

The steering handle 3 is also coupled to an actual hand steering-angle transmitter 8, which is actuated by the steering handle 3 and produces actual hand steering-angle signals $HLW_{ist}$, correlating with the actuated position of the latter to a hand-force controller 5 and feeds these to a desired hand-force transmitter 9. In this desired hand-force transmitter 9, the actual hand steering-angle signal $HLW_{ist}$ at the input is assigned a desired hand-force signal $HK_{soll}$ at the output as a function of a specified relationship between hand steering angles and hand forces, this desired hand-force signal being passed to the hand-force controller 5.

The wheel-force control loop 2 is of similar construction. The steered vehicle wheels 7 are accordingly coupled by means of a steering linkage 10 to a wheel-force actuator 11, which drives the steered vehicle wheels 7 for the purpose of adjusting them. Also coupled to the steered vehicle wheels 7 are an actual wheel-force transmitter 12 and an actual wheel steering-angle transmitter 13. While the actual wheel-force transmitter 12 generates an actual wheel-force signal $RK_{ist}$ that correlates, with the forces prevailing at the steered vehicle wheels 7 and passes it to a wheel-force controller 14, the actual wheel steering-angle transmitter 13 generates an actual wheel steering-angle signal $RLW_{ist}$ that correlates with the actuated position of the steered vehicle wheels 7, and passes it to a desired wheel-force value generator 15. This desired wheel-force value generator 15 generates a desired wheel-force signal $RK_{soll}$ as a function of a specified relationship between wheel-steering angles and wheel forces and passes it to the wheel-force controller.

The two control loops 1 and 2 are coupled to one another by two coupling lines, namely a wheel/hand coupling line 16 and a hand/wheel coupling line 17, the actual force values from one control loop 1 or 2 being fed respectively to the controller 14 or 5 of the other control loop 2 1or 1. In order to match the forces (hand forces and wheel forces) controlled by the individual force control loops 1 and 2 to one another, a wheel/hand coupling element 18 is arranged in the wheel/hand coupling line 16, and a hand/wheel coupling element 19 is arranged in the hand/wheel coupling line 17. These coupling elements 18 and 19 are used to define a force transmission ratio between the forces which occur at the steered vehicle wheels 7 and at the steering handle 3. For example, the actual hand-force signals $HK_{ist}$ are multiplied by a factor k in the hand/wheel coupling element 19 before being fed to the wheel-force controller 14 as $k \cdot HK_{ist}$. In a corresponding manner, the actual wheel-force signals $RK_{ist}$ are divided by this factor k in the wheel/hand coupling element 18 before they are fed to the hand-force controller 5 as $1/k \cdot RK_{ist}$. The coupling elements 18 and 19 or their functions can also be integrated into the hand-force controller 5 and wheel-force controller 14 respectively.

The steering system according to the invention is furthermore fitted with a steering-parameter generator 20, which receives information on the current operating state of the vehicle from sensors or from an on-board computer 21 of the vehicle fitted with the steering system according to the invention, for example. From these vehicle operating states, the steering-parameter generator 20 then generates parameters P that influence the steering behaviour of the steering system. For example, parameters $P_1$ to $P_3$ are fed to desired hand-force transmitter 9 in order, at that point, to vary the relationship between hand steering angles and hand forces as a function of certain vehicle operating states (e.g. vehicle speed, vehicle mass, transverse vehicle acceleration). Further parameters $P_4$ and $P_5$ act on the coupling elements 18 and 19 in order to vary the proportionality factor k as a function of speed at that point, for example. In this way, it is possible, on the one hand, to vary the transmission ratio between hand forces and wheel forces and thus the servo assistance and, on the other hand, to vary the ratio between hand steering angles and wheel steering angles and thus the steering ratio. Moreover, the steering-parameter generator 20 can act by means of the parameters $P_5$–$P_8$ on the desired wheel-force generator 15 in order to alter the relationship between wheel steering angles and wheel forces at that point. By exerting this influence by means of parameters it is possible, for example, to achieve a mass/spring damping characteristic that is dependent on the vehicle speed. It is also possible for the steering ratio to be held constant with a variable force transmission ratio or likewise to be varied as a function of speed, for example.

The steering system according to the invention operates as follows:

When the driver of the vehicle actuates the steering handle 3, this actuation is assigned an actual hand steering-angle signal $HLW_{ist}$ by the actual hand steering-angle generator 8 and is fed to the desired hand-force generator 9. The latter generates a desired hand-force signal $HK_{soll}$ for the hand force that is to be felt at the set position of the steering handle 3 and feeds this to the hand-force controller 5. At the same time, the actual hand-force generator 4 generates an actual hand-force signal $HK_{ist}$, which is available both to the hand-force controller 5 and, as an adapted actual hand-force signal $k \cdot HK_{ist}$, to the hand-force controller 14 via the hand/wheel coupling line 17 and by means of the hand/wheel coupling element 19. The wheel-force controller 14 then inputs an actuating movement into the steered vehicle wheels 7, the actual wheel-force transmitter 12 producing an actual wheel-force signal $RK_{ist}$ and feeding it, on the one hand, to the wheel-force controller 14 and, on the other hand, via the wheel/hand coupling line 16 and by means of the wheel/hand coupling element 18, to the hand-force controller 5 as an adapted actual wheel-force signal $1/k \cdot RK_{ist}$. In the hand-force controller 5, a control command for the hand-force actuator 6 is then determined from the actual hand-force signal $HK_{ist}$, from the adapted actual wheel-force signal $1/k \cdot RK_{ist}$ and from the desired hand-force signal $HK_{soll}$, and the actuator then produces at the steering handle 3 a force that takes account both of restoring forces of the steering handle 3 and of reactive forces of the steered vehicle wheels 7. An actual wheel steering-angle signal $RLW_{ist}$ is furthermore produced at the wheels by the actual wheel steering-angle transmitter 13, and this signal is fed to the desired wheel-force transmitter 15 and processed by the latter to give a desired wheel-force signal $RK_{soll}$, which corresponds to the force which should prevail at the steered vehicle wheels 7 at the detected wheel steering angle.

By means of the coupling, in accordance with the invention, of the force control loops 1 and 2 by way of the actual force values, direct, rapid and precise coupling that corresponds in terms of haptic effect to mechanical positive coupling is established between the steered vehicle wheels 7 and the steering handle 3.

While the above description constitutes the preferred embodiment of the invention, it will be appreciated that the invention is susceptible to modification, variation, and change without departing from the proper scope or fair meaning of the accompanying claims.

What is claimed is:

1. A control system for coupling first and second final control elements, comprising:
   a first force control loop, including a first actual-force transmitter for producing a first actual-force signal correlating with actuating forces prevailing at the first final control element, a first actual position transmitter for producing a first actual position signal correlating with an actuated position set at the first final control element, a first desired-force generator, which generates a desired-force signal from the first actual-position signal as a function of a first specified relationship between actuated positions and actuating forces, and a first force controller, which actuates a first force actuator,
   a second force control loop, including a second actual-force transmitter for producing a second actual-force signal correlating with actuating forces prevailing at the second final control element, a second actual position transmitter for producing a second actual position signal correlating with an actuated position set at the second final control element, a second desired-force generator, which generates a second desired-force signal from the second actual-position signal as a function of a second specified relationship between the actuated positions and the actuating forces, and a second force controller, which actuates a second force actuator,
   wherein the force actuators are actuated, as functions of the force signals at inputs of the force controllers, so that the specified relationships between the actuated positions and the actuating forces are established at the final control elements,
   wherein the first actual-force signal is also fed to the input of the second force controller,
   wherein the second actual-force signal is also fed to the input of the first force controller,
   wherein the first actual-force signal is multiplied by a proportionality factor before being fed to the input of the second force controller, and
   wherein the second actual-force signal is divided by the proportionality factor before being fed to the input of the first force controller.

2. The control system according to claim 1, wherein a first coupling line, which couples an output of the first actual-force transmitter to an input of the second force controller, has a first coupling element, which carries out multiplication of the first actual-force signals by the proportionality factor, arranged therein, and wherein a second coupling line, which couples an output of the second actual-force transmitter to an input of the first force controller, has a second coupling element, which carries out division of the second actual-force signals by the proportionality factor, arranged therein.

3. The control system according to claim 2, wherein the proportionality factor can be varied as a function of parameters.

4. The control system according to claim 3, and further comprising a coupling-parameter generator which generates the parameters as a function of operating parameters of a device containing the control system and feeds these parameters to the first and second coupling elements and to the first and second desired-force generators.

5. The control system according to claim 1, wherein said first and second specified relationships are different.

6. The control system according to claim 1, wherein at least one of the first and second specified relationships can be varied as a function of parameters.

7. The control system according to claim 1, wherein the control system is a steer-by-wire steering system of a motor vehicle, wherein the first final control element is at least one steering handle of the motor vehicle, and wherein the second final control element is at least one steered vehicle wheel of the motor vehicle.

* * * * *